Feb. 28, 1956 E. E. WOLLER Re. 24,125

SOFA BED

Original Filed Sept. 8, 1941 4 Sheets-Sheet 1

INVENTOR.
Edward E. Woller
BY Evans, Pond & Anderson
ATTORNEYS.

SOFA BED

Original Filed Sept. 8, 1941 4 Sheets-Sheet 2

INVENTOR.
Edward E. Woller
BY Evans, Paul & Anderson
ATTORNEYS.

SOFA BED

Original Filed Sept. 8, 1941 4 Sheets-Sheet 3

INVENTOR.
Edward E. Woller
BY Evans, Pond & Anderson
ATTORNEYS.

Feb. 28, 1956 E. E. WOLLER Re. 24,125
SOFA BED
Original Filed Sept. 8, 1941 4 Sheets-Sheet 4
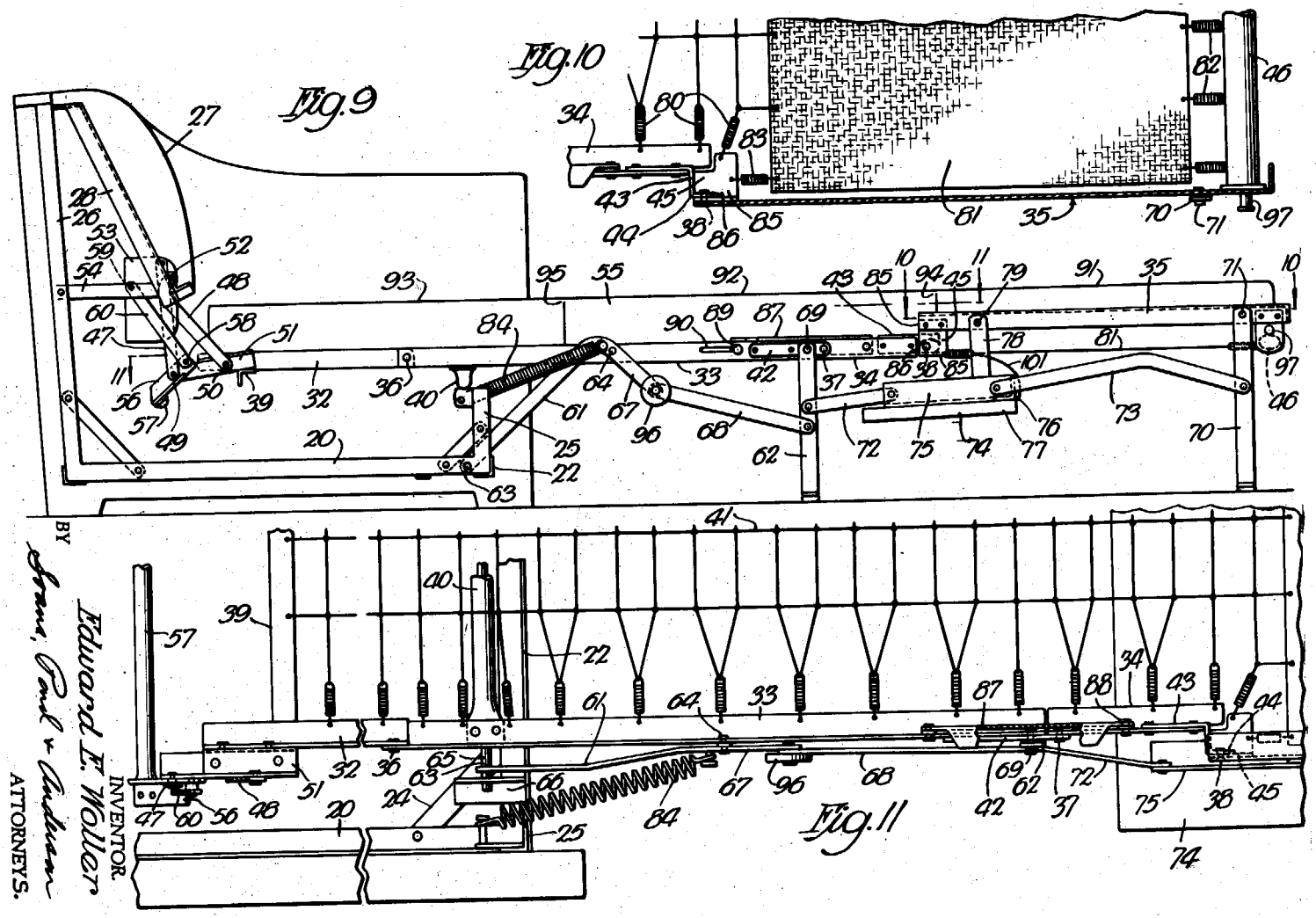
INVENTOR.
Edward E. Woller
BY Evans, Pond & Anderson
ATTORNEYS.

United States Patent Office

Re. 24,125
Reissued Feb. 28, 1956

24,125

SOFA BED

Edward E. Woller, Kenosha, Wis., assignor to Simmons Company, a corporation of Delaware Original No. 2,352,989, dated July 4, 1944, Serial No. 409,951, September 8, 1941. Application for reissue August 9, 1955, Serial No. 527,434

9 Claims. (Cl. 5—13)

Matter enclosed in heavy brackets [ ] appears in the original patent but forms no part of this reissue specification; matter printed in italics indicates the additions made by reissue.

This invention relates to improvements in sofa beds, and has particular reference to a construction embodying a series of foldably connected mattress or cushion-supporting, spring sections which are adapted to be folded into seat or sofa-forming position and to be withdrawn and unfolded to form a bed.

The main objects of the present invention are to provide a sofa bed of the character indicated, wherein the folding and unfolding movement may be easily and quickly accomplished; to provide such a structure in which the foldable bed parts will be adequately and rigidly maintained in bed position; to provide such a structure in which the parts, when folded to sofa position, will be more or less locked against unfolding, but nevertheless readily unfoldable when properly manipulated; to provide an arrangement in which the foldable sections are positively guided to their fully folded position; and in general it is the object of the invention to provide an improved sofa bed of the character indicated.

Other objects and advantages of the invention will be understood by reference to the following specification and accompanying drawings (4 sheets) in which there is disclosed a sofa bed embodying a selected form of the invention.

In the drawings,

Fig. 9 is a side elevation illustrating the fully extended position.

Figure 1:
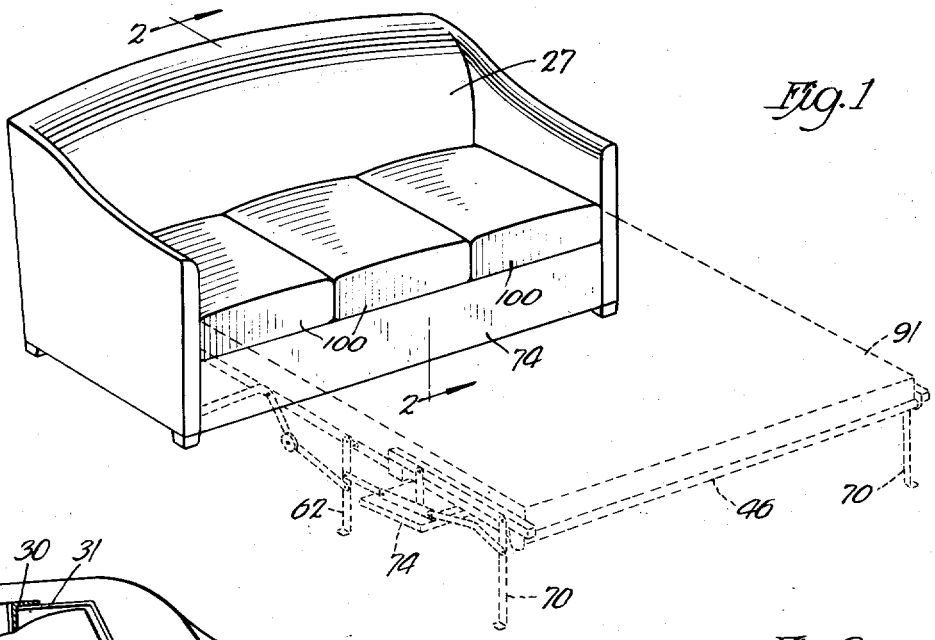
Fig. 1 is a perspective illustrating the sofa bed herein contemplated, the extended or bed position thereof being indicated in dotted lines.

Figs. 10 and 11 are plan sections respectively on the lines 10—10 and 11—11 of Fig. 9.

The improved sofa bed structure herein disclosed embodies a normally stationary frame structure comprising approximately horizontal end members such as indicated at 20, the same being secured to wood or other side frames provided with legs 21 for supporting the structure on the floor. The end members 20 may be of angle iron form and they are rigidly connected by longitudinally extending front and rear frame members 22 and 23 respectively. Corner braces such as indicated at 24 may be employed for adding rigidity to the horizontal bottom frame formed by the members 20, 22 and 23.

At the front of the horizontal frame there is provided at each end an upright post 25, the same being suitably braced by angularly extending braces as shown. At the back of the structure there are provided upwardly and rearwardly extending frame members, such as shown at 26, the same being also suitably braced by angularly extending braces as shown. A normally stationary back cushion 27 may be permanently mounted and supported by a forwardly and downwardly constructed frame structure embodying end members 28, and lower horizontally disposed connecting member 29 and a horizontally disposed top connecting member 30 which serves to connect both the end members 28 and the end members 26. As shown, the upper ends of the back cushion frame members 28 are bent rearwardly to provide a short horizontal top leg 31 to provide a desired amount of horizontal depth behind the back structure.

The foldable bed bottom structure, which also forms the seat of the sofa bed, comprises in this instance four sections respectively designated 32, 33, 34 and 35. The respectively adjacent ends of such sections are pivotally connected together as indicated at 36, 37 and 38. Each of these sections embody angle iron side members and the side members of the section 32 are rigidly interconnected adjacent one end thereof by means of a connecting member 39. The side members of the section 33 are interconnected by means of a member 40 which is offset downwardly from the plane of the end members so as to avoid interference with the normal sagging of the bed spring fabric 41 which is stretched between the horizontal flanges of said angle iron members, as clearly shown in the drawings.

The pivotal connection 36 between the members 32 and 33 is effected between mutually overlapped vertical flange portions of the respective side members, as clearly shown in Fig. 11. The horizontal flange portion of the end members of section 33 are cut away to provide space for accommodating the horizontal flange portions of the members 32 in co-planar relation to the horizontal flanges of the member 33.

For pivotally connecting together the sections 33 and 34, bars such as 42 are rigidly attached to the members 33 and extend beyond the ends thereof so as to overlap the vertical flanges of the members 34. The pivot connection 37 is then effected through said overlapping parts.

The section 35 constitutes the seat section in that when the structure is folded, the seat cushions are supported by said section. The side members of said seat section 35 are inverted with respect to the disposition of the side members of the other sections so that the horizontal flanges thereof extend inwardly from the upper edges of the side members instead of from the lower edges. Said side members of the seat section 35 are also disposed in offset relation to the plane of the sections 32, 33 and 34 when in extended or bed position. For pivotally connecting the sections 34 and 35, there are rigidly attached to the side members of the section 34 bars such as indicated at 43, the same having extended end portions bent outwardly to provide offset portions 44 which are adapted to engage the inside faces of bracket members such as indicated at 45 which are secured to and depend from the side members of the seat section 35 when in bed position. The pivot connection 38 is, as shown, effected between the bracket 45 and portion 44 of the bar 43. As indicated, the side members of the section 35 are spaced outwardly somewhat from the plane of the side members of the other sections, the purpose of such outward spacing being that of increasing the side to side dimension of said seat section so that it will snugly fit between the side arms of the sofa structure, whereas the sections 32, 33 and 34 will be movable freely therebetween without rubbing against said side arms.

The free ends of the side members of the section 35 are rigidly connected together by means of a longitudinal member 46 which may have its ends flattened and bent upwardly for attachment to the side members or be otherwise connected in any suitable manner.

The inner or head end of the section 32 is supported by means of a pair of hangers or links 47 and 48, the lower ends of which are pivotally connected as shown at 49 and 50 respectively to angle iron extensions 51 which are in turn rigidly secured to the side members of the section 32. The upper end of the link 48 is curved as shown and is pivotally connected at 52 to a plate 53 which is rigidly mounted on the cushion supporting frame 28 and on a strut 54 which extends between the lower end of said frame 28 and the adjacent upright rear member 26.

For supporting a portion of the mattress 55 when the structure is in folded or sofa position, there is provided at each side of the structure an arm 56 pivotally mounted co-axially with the pivot connection 49 on the extensions 51. Said arms 56 are connected by a longitudinal member 57. The frame-like extension structure comprising the parts 56 and 57 is rockable about the pivot mounting 49 and its position is controlled by links such as indicated at 60, the lower ends of which are pivoted as shown at 58 to the free ends of the arms 56 and the upper ends of which are pivoted as indicated at 59 to the plates 53.

The section 33 is supported by its pivot connection 36 to the section 32, by a link 61 and by a leg 62. The link 61 is pivoted at its lower end, as shown at 63, to the stationary bottom frame structure comprising the parts 20 and 22 and at its upper end it is pivoted as shown at 64 to the adjacent side member of the section 33. The pivot mounting 63 is preferably provided by securing the lower end of the link 61 to a rod or shaft 65 which is suitably journalled in brackets 66 or the like carried by said bottom frame, so that rocking movement of the links 61 at opposite sides of the structure will be simultaneous and uniform, thereby preventing any tendency of the parts to assume a cramping relationship.

The upper end of the link 61 is bent and extended downwardly, as shown at 67, and it is connected by means of a link 68 to the leg 62. The leg 62 is pivotally mounted at its upper end, as shown at 69, on the bar 42 and side member of the section 33.

The short section 34 constitutes a hinge section for connecting the sections 33 and 35 and the outer or free end of the section 35 is supported at each side by a leg 70 which is pivotally secured at its upper end, as shown at 71, to the side member of the section 35.

The legs 62 and 70 at each side of the structure are interconnected by means of links 72 and 73 and an intervening front board structure 74. Said front board structure 74 comprises a suitable angle iron framework embodying side pieces 75 and a longitudinally extending end connecting piece 76, said parts 75 and 76 constituting a frame to which a front board or upholstering panel 77 is secured. The side members 75 of said front board structure are provided with arms, such as shown at 78, which are pivotally attached at their free ends, as shown at 79, to the side members of the section 35. The side members 75 and arms 78 are formed integrally or are rigidly connected and said side members 75 constitute link connections between the links 72 and 73.

The bed spring fabric 40 is preferably of a suitable wire link construction in the sections 32, 33 and 34. In the section 35, a suitable textile fabric material 81 is preferably employed, said fabric being stretched between the wire link fabric 41 and the longitudinal cross-member 46. Suitable coil springs 80 are employed for resiliently supporting the wire bed fabric structure in the respective sections and coil springs 82 similarly support the outer end of the textile fabric 81. A coil spring 83 is also stretched between the bracket member 45 and the adjacent corner of the textile fabric portion 81 of the mattress supporting fabric to resiliently support such corner in its proper position, so that seat cushions placed on said fabric portion 81 will be adequately supported at all points.

Coil springs, such as indicated at 84, interconnect a portion of the link 61 adjacent its pivot 64 with a stationary part such as the upper end of the front corner post 25. When the structure is extended to bed position, as shown in Figs. 9 and 11, the spring 84 is under tension.

Figure 8:
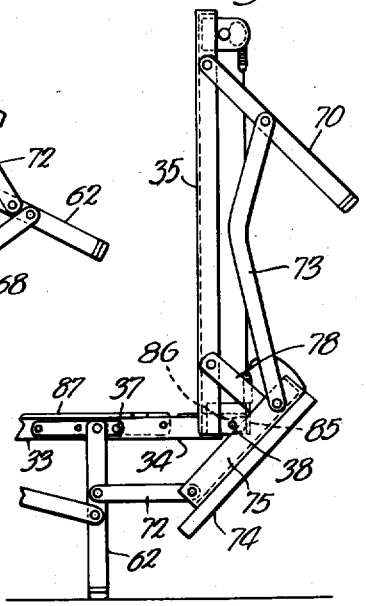
Fig. 8 is a fragmentary side elevation of still another intermediate position.

To close the structure, i. e. to fold it from bed position to sofa position, the outer or free end of the section 35 is moved upwardly and inwardly until it reaches an approximately vertical position, as shown in Fig. 8. Such movement of the section 35 relative to the sections 33 and 34 and the leg 62 serves to initiate folding movement of the leg 70, this being the result of the link connections 72, 75 and 73 between the legs 62 and 70 and the arm connection 78 between the link 75 and section 35.

Figure 7:
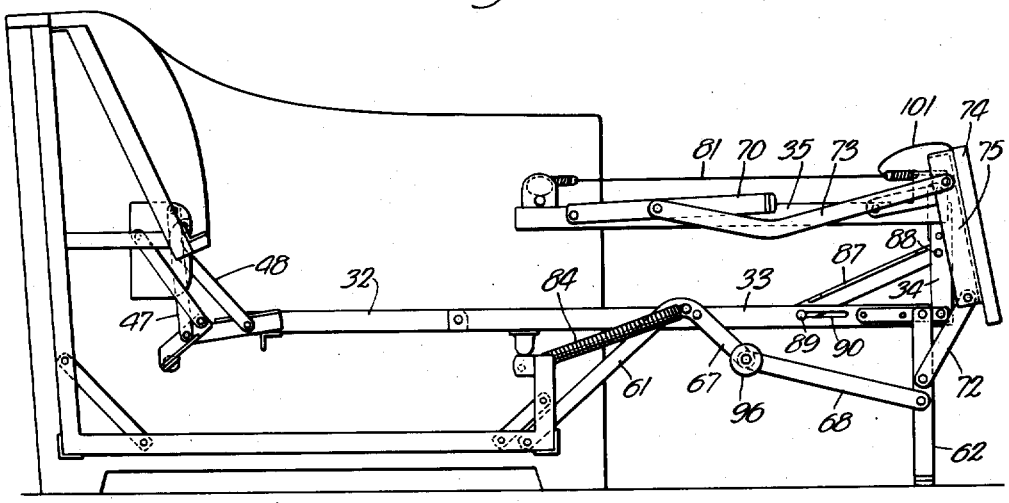
Figs. 6 and 7 are side elevations respectively, showing different intermediate positions of the structure.

Continuing the folding movement of the bed structure, the section 35 is rocked inwardly and downwardly, this time about the pivot connection 37 between the sections 34 and 33, the section 34 being caused to assume an approximately vertical position and the section 35 an approximately horizontal, inverted position, as best shown in Fig. 7.

The folding movement of the section 35 relative to the section 34 is limited by engagement of the plate portion 85 of the bracket 45 with the end 86 of the bar 43. Folding movement of the section 34 relative to the section 33 is limited by means of a bar 87 which is pivoted at one end, as shown at 88, to the section 34 intermediate its ends and slidably mounted, as shown at 89 in a slot 90 provided in the side member of the section 33. When the section 34 reaches its vertical position, the sliding connection of the member 87 with the side member of the section 33 is at one limit of its movement. Said member 87 also serves in the unfolded or extended position of the sections to limit the unfolding movement of the section 34 relative to the section 35 incident to the engagement of its sidewise extending flange with the upper edges of the side members of the sections 33 and 34, as clearly shown in Fig. 9. It will be observed that because of this stop for the unfolding movement of the section 34 relative to the section 33, said section 34 is effectively supported by the leg 62, and in turn is capable of supporting the end of the section 35 which is connected thereto.

Incident to the folding of the section 35 to its horizontal position, the link connections 72, 75 and 73 serve to effect further folding of the leg 70 and to cause the front board 74 to approach a position in parallel relation closely adjacent the front or outside of the then vertical section 34 (see Fig. 7).

Figure 6:
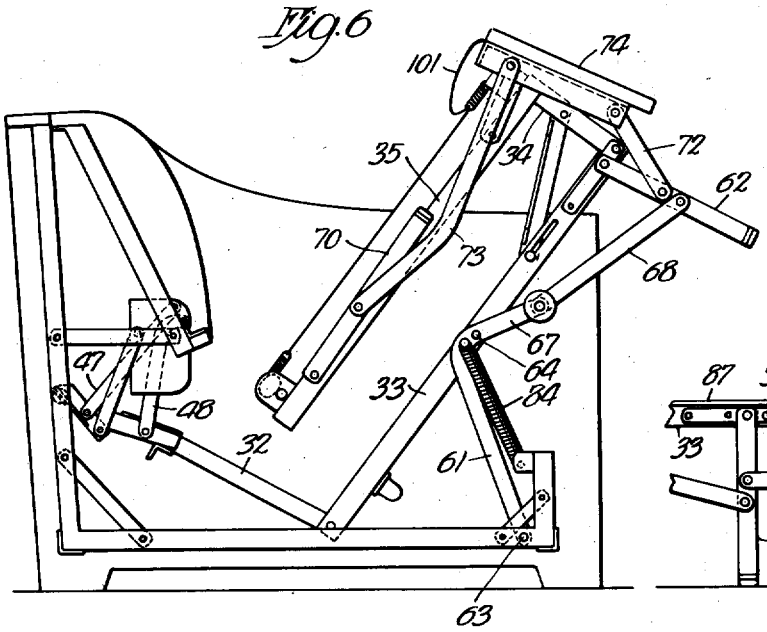

Completion of the folding of the bed structure is effected by lifting the front ends of the sections 33 and 35 upwardly and simultaneously moving the same inwardly. Such upward and inward movement is guided by the link 61 in cooperation with the links 47 and 48 and the inner or head section 32. It will be observed that the double link support 47 and 48 for the bed section 32 positively controls the path of movement of said section 32 so that the end of the section 32 which is connected to the section 33 will exercise a controlling influence on the path through which the section 33 moves in its folding and unfolding movements. The spring 84 assists the operator in performing the completion of the folding movement in that said spring tends to rock the link 61 in a counterclockwise direction, as viewed in Figs. 6 and 7. When the folded bed structure reaches an inclined position, such as illustrated in Fig. 6, the weight of the structure then tends to continue the movement without assistance from the operator and such gravity effected movement is checked or cushioned by the spring 84, which is so arranged that it will necessarily be stretched during the final portions of the folding movement. By examination of Figs. 3 and 6 it will be seen that the section 32 is caused, in the folding movement, to move into an upwardly extending position behind the back rest frame 28.

Incident to the upward movement of the inner or head end of the section 32, the extension frame structure, comprising the parts 56 and 57, is caused by the link 60 to assume a more nearly coplanar relation to the extension arms 51 of the section 32.

Figure 2:
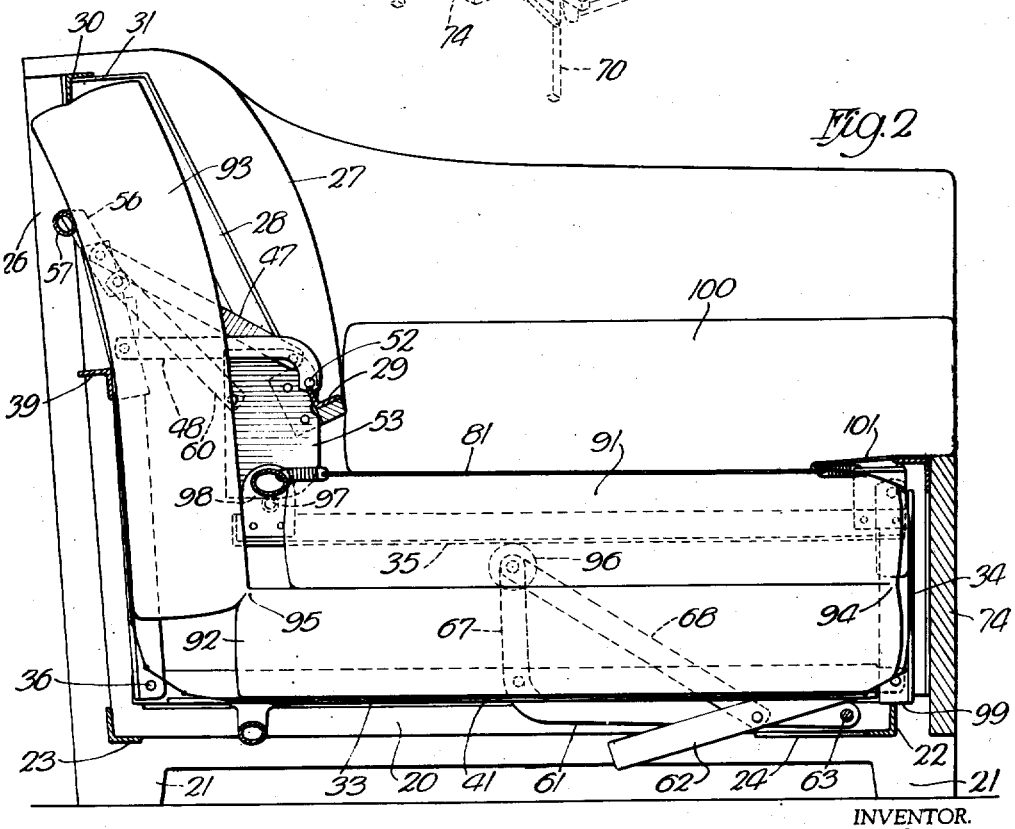
Fig. 2 is a transverse section through the structure on a plane approximately as indicated by the line 2—2 of Fig. 1.
Figure 4:
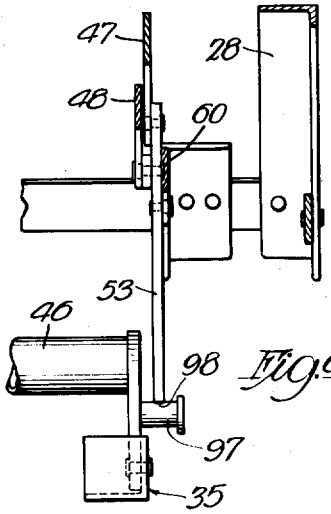
Fig. 4 is a section on the line 4—4 of Fig. 3.
Figure 5:
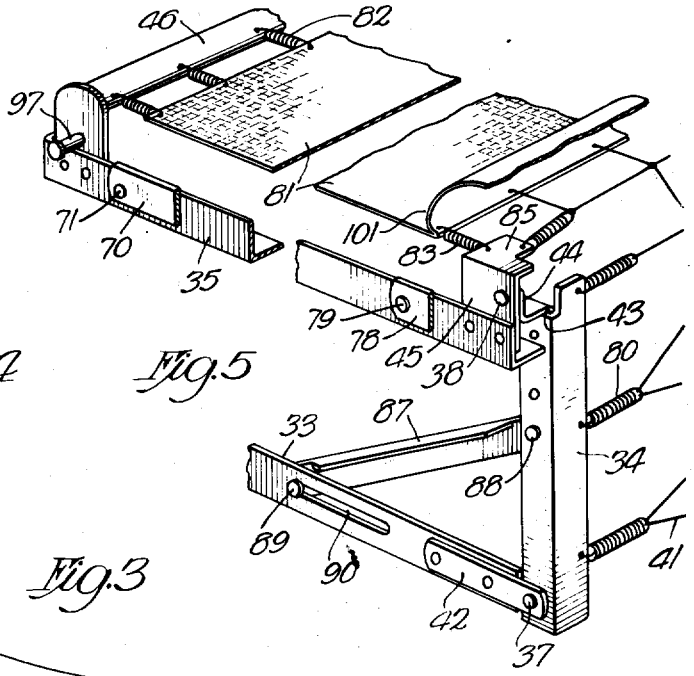
Fig. 5 is a perspective of a portion of the foldable bed forming sections showing their folded relationship.

Incident to the folding of the bed sections 32, 33, 34 and 35 in the manner explained, the mattress 35 will be shifted endwise toward the head end of the structure, i. e., toward the back-rest of the sofa. As indicated in Fig. 9, the mattress 55 may be of substantial thickness and it is preferably formed in three sections, 91, 92 and 93, having hinge connections 94 and 95 which permit the mattress to be folded. The section 91 is preferably tied by suitable tapes or the like stitched to the same to the bed spring section 35, so that the mattress section will not separate from the bed spring section during the folding and unfolding operation. The attachment of the mattress section 91 to the bed spring section 35 should, however, be sufficiently loose to permit a slight amount of lateral shifting to the mattress section 91 relative to the bed section 35, as may be required during the folding and unfolding movements. As herein shown, the mattress is of such thickness that when the section 91 is folded into overlying relation to the section 92 (see Fig. 2) it occupies substantially all of the space between the portion of the bed spring fabric 41 in the bed section 33 and the textile fabric portion 81 in the section 35. As shown in Fig. 2, the mattress must be moved endwise a distance approximating the length of the hinge section 34 since no portion of the thickness of the mattress remains parallel to said section in the folded position of the bed bottom structure. Similarly, some additional endwise movement of the mattress relative to the bed spring fabric is necessitated by the angular position of the mattress section 93 relative to the section 92, wherein a portion of the bed spring fabric adjacent the hinge connection 36 is bared. The pivot frame extension parts 56 and 57 serve to support the upper end portion of the mattress section 93 in folded position, so as to maintain the same within the confines of the back-rest structure, as clearly shown in Fig. 1. In the absence of the said supporting structure, the mattress might tend to fold rearwardly about the then uppermost cross-member 39 of the bed section 32.

Figure 3:
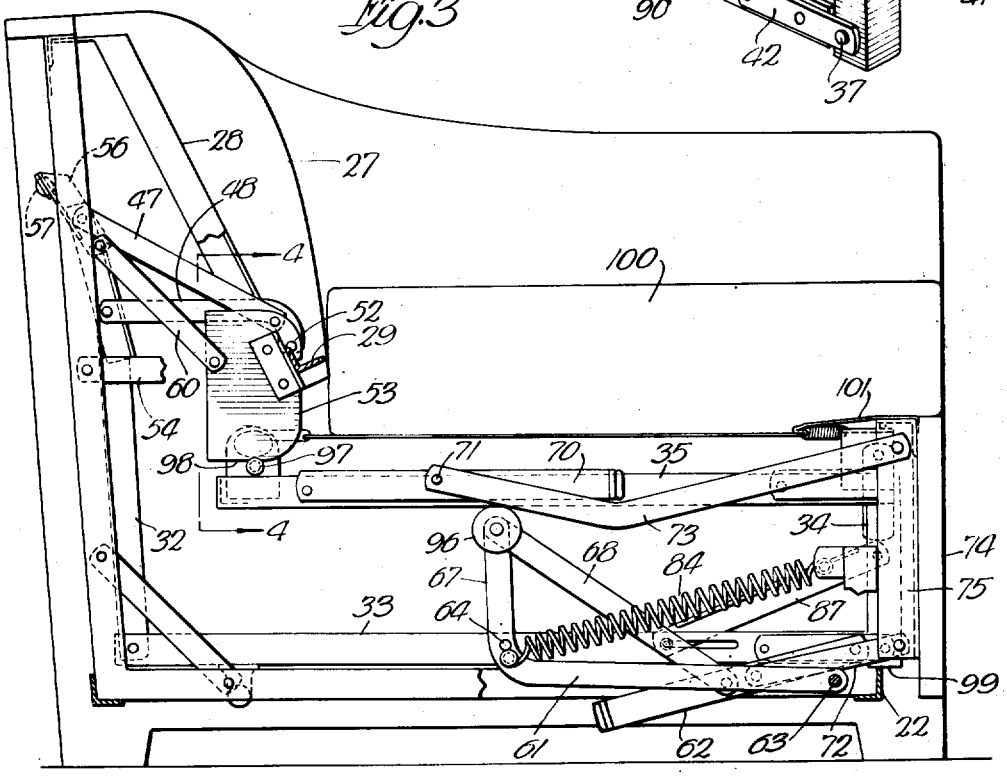
Fig. 3 is a side elevation with one of the end arms removed to reveal the structural details, certain other portions being broken away to more clearly illustrate the construction.

The folding movement of the section 35 relative to the section 33 is limited, or in other words, the free end portion of the section 35 is supported in approximately parallel folded relation to the section 33 (as shown in Figs. 2 and 3) by means of a roller 96 or other suitable provision on the end of the link extension 67. Said roller 96 in the illustrated construction may be mounted co-axially with the pivot connection between the said link extension 67 and the link 68 and it is of such size that it will engage the bottom surface of the adjacent side frame member of the section 35. It will be apparent that the arm 67 and link 61 are effectively held against rocking movement under the weight of the section 35 by reason of the pivot connection 63 between the link 61 and the stationary frame structure of the sofa.

To positively hold the rearward or free end of the seat section 35 in its seat position, as shown in Figs. 2 and 3, there is provided at the free end of the section 35 a laterally extending headed stud or post 97, the same being so located that it is adapted to engage the bottom edge 98 of the plate 53. The stud 97 moves into place under the edge of the plate 53 without special manipulation and merely as an incident to the folding of the structure, as already explained.

Incident to the final folding movement of the structure, the leg 62 is folded inwardly under the same, as will be apparent by comparison of Figs. 2 and 3 with Fig. 6, such folding of the leg being effected by reason of the link connection 68 between said leg 62 and the end of the link extension 67. The front end of the folded bed bottom structure is supported by direct engagement of the then lower end 99 of the side member of the section 34 with the upper edge of the front frame member 22 and said hinge section 34 serves, of course, to support the then front end of the seat section 35 rigidly in its seat-forming position.

The front board structure 74 is automatically pulled into its front-forming or closing position, as illustrated in Figs. 2 and 3, as an incident to the folding of the leg 62, this being accomplished by reason of the link connection 72 between said leg 62 and the lower end of said front board structure.

The textile fabric portion 81 of the bed spring fabric is well adapted to support suitable seat cushions, such as indicated at 100, the same being removably placed on said textile fabric bed spring portion 81. To cover the wire link portion of the bed spring fabric at the front portion of the seat section, as shown in Figs. 2 and 3, there is provided a textile fabric continuation 101 of the textile fabric portion 81, said extension or continuation 101 being formed by refolding the textile fabric element to form a double thickness edge portion for connection to the wire link bed spring fabric and then again refolding or turning the portion 101 of the textile fabric more or less in continuation of the normal plane of the portion 81 and attaching said extension portion 101 to the upper edge of the front board structure 74. In the extended or unfolded position of the bed bottom structure, said textile fabric portion 101 may be relatively loose but in the seat-forming position of the bed bottom structure said portion 101 assumes a fairly taut position between the upper edge of the front board structure 74 and the front edge of the bed spring fabric section 81. In this arrangement the cushions 101 are adequately supported by flexible and resiliently supported fabric which contacts with the entire bottom area of the cushions. This is advantageous as compared with the supporting of cushions on wire link fabric, either with or without an interposed textile fabric section, in that the uniform, all-over support thereby provided, is better adapted to the supporting of both inner spring and felt or like packed cushions. Furthermore, the all-over support will not impress a noticeable design on the cushion if made of material embodying a long nap or of other material which will readily assume the imprint of any article with which it has engagement for any considerable length of time.

The described structure results in a sofa bed which may be easily and quickly converted from a sofa to a bed without requiring movement of the main supporting sofa frame structure. Also, the arrangement is such that in the folded condition the upwardly folded rear or head end portion of the mattress is effectively retained within the confines of the back rest of the sofa so that the sofa may be placed closely adjacent a wall without interfering with the unfolding of the bed sections.

The described arrangement for locking the rear end of the seat-forming section against upward movement serves in cooperation with the supporting roller 96 and supporting section 34 to rigidly hold the section 35 in seat position so that rattling of the structure incident to a person's sitting down or getting up from the sofa is effectively eliminated. It will be observed that the arrangement is such that the roller 96 forces the inner or rear end of the seat section 35 upwardly so that its stud 97 firmly engages the bottom edge 98 of the plate 93.

Various changes in the described structure may be made without departing from the spirit of the invention, the scope of which should be determined by reference to the following claims, the same being construed as broadly as possible consistent with the state of the art.

I claim:

1. A sofa bed of the class described comprising a main frame having a back rest part, a foldable bed bottom having a section movable from a folded, vertically disposed position behind said back rest part to a horizontally disposed, bed position forwardly of said back rest part, means connecting said section to said main frame for such movement, and a mattress support comprising side members pivotally mounted intermediate their ends on said bed section, mattress supporting means extending between the outer portions of said side members, and links pivotally connecting the inner ends of the respective side members with said back rest part for effecting rocking of the outer portions of said side members and said mattress supporting means upwardly and inwardly as an incident to folding of the bed bottom, said mattress support being thereby operative to hold an overlying mattress portion within the confines of said back rest frame part.

2. In a sofa bed of the class described, a plurality of foldably connected bed-bottom-forming sections, one of said sections, when in folded position, constituting a seat section, a front structure adapted to depend from adjacent the front edge of said seat section, mattress supporting means carried by said sections and comprising wire link fabric in certain of said sections and textile fabric in said seat section, said wire link and textile fabrics having interconnected terminal edges adjacent the line of folding connection between said seat section and the adjacent section but spaced rearwardly from said front structure, said textile fabric having a flap part folded rearwardly so as to provide a two-ply, folded edge portion for attachment to said wire link fabric, said flap being refolded forwardly into overlying relation to the connections between said fabrics and having its front edge secured to said front structure.

3. A sofa bed of the class described comprising a normally stationary frame, a bed bottom comprising pivotally connected sections, means for mounting said sections on said frame for movement from substantially coplanar bed position to folded, sofa position whereby one of said sections moves laterally rearwardly into said folded position, and means engageable by said one section as an incident to its said lateral rearward movement for locking said section against upward movement from folded position.

4. A sofa bed of the class described comprising a normally stationary frame, a foldable bed bottom comprising a section which, when the bed bottom is folded, constitutes a seat section, there being one or more other sections foldably connected to said seat section, means for mounting said bed bottom on said frame for movement from substantially coplanar bed position to folded, sofa position whereby the rearward portion of said seat section moves laterally rearwardly to said folded position, and means on the rearward portion of said seat section and said stationary frame interengageable as an incident to said laterally rearward folding movement of said seat section for locking said rearward portion of the seat section against upward movement from seat position.

5. A sofa bed of the class described comprising a normally stationary frame, a foldable bed bottom comprising a section which, when the bed bottom is folded, constitutes a seat section, there being one or more other sections foldably connected to said seat section, means for mounting said bed bottom on said frame for movement from substantially co-planar bed position to folded, sofa position whereby the rearward portion of said seat section moves laterally rearwardly to said folded position, a fixed member mounted on said frame, and means carried by the rearward portion of said seat section and movable under and engageable with said fixed member as an incident to the lateral rearward folding movement of said seat section for locking said rearward seat section portion against upward movement from seat position.

[6. In a sofa bed of the class described, the combination of a plurality of bed bottom sections connected together so as to be foldable from and to sofa-forming position respectively to and from bed position, one of said sections constituting a sofa seat section when the sections are in sofa-forming position, a front member connected to certain of said sections and depending from adjacent the front edge of said seat section when in sofa position, mattress supporting fabric in said sections which, in the seat section, is also operative to support a seat cushion when the sections are in sofa-forming position, the arrangement being such that said fabric, when the sections are in sofa-forming position, is spaced from the upper edge of said front member, and a fabric element connecting the upper edge of said front member and the front portion of the cushion supporting fabric in said seat section when in sofa-forming position, said fabric element serving to provide seat cushion support intermediate the fabric in said seat section and the upper edge of said front member.]

[7. In a sofa bed of the class described, the combination of a foldable bed bottom frame comprising a pair of sections of substantial width and a relatively narrow hinge section interposed between said pair of sections and pivotally connected at its ends respectively to said sections, bed spring fabric extending from end to end and from side to side of said bed bottom frame, means connecting the periphery of said bed spring fabric to the adjacent portions of said bed bottom frame, said bed bottom frame and fabric being foldable from co-planar bed position to sofa forming position wherein one of the wider sections of the frame is disposed in relatively superposed relation to the other and said hinge section is disposed in upwardly extending position intermediate said other sections, a cover member normally overlying the space between the hingedly connected ends of said wider sections, connections between said cover member and the bed bottom frame for causing the same to assume a position closely adjacent the pivotally connected ends of said bed bottom frame when folded and a position substantially spaced from said frame when unfolded, and means extending between the upper portion of said cover member and the adjacent portion of the bed spring fabric carried by the uppermost section of the folded bed bottom thereby to provide effective seat cushion supporting area intermediate the upper edge of said cover member and said bed spring fabric in the folded position of the bed bottom.]

[8. An article of furniture embodying a foldable bed bottom frame comprising a plurality of sections adjustable from substantially co-planar bed position, to collapsed position wherein one section is disposed in approximately horizontal seat position, a second section depends from the front edge of said seat section, and a third section extends rearwardly under said seat section from said second section, bed spring fabric extending from end to end and from side to side of said foldable bed bottom frame and foldable in accordance with the folding of said sections, means connecting the periphery of said bed spring fabric to the adjacent portions of said bed bottom frame, a cover member for covering the outside of said second section when in folded position, connections between said cover member and said bed bottom frame for causing the cover member to be substantially spaced from said second section when in bed position and to assume a position closely adjacent said second section when in folded position, and means extending between the upper portion of said cover member and said bed spring fabric in the forward portion of said seat section when in seat position, said means serving in cooperation with the bed spring fabric in said seat section to support a seat cushion when the bed bottom is in folded position.]

*9. A sofa bed structure of the class described comprising a plurality of bed bottom sections connected together so as to be foldable from and to sofa-forming position respectively to and from bed position, said sections including an end section constituting a cushion-supporting seat section when the sections are in sofa-forming position and being reversed when unfolded so as to form the outer end section of the bed, a non-reversible*

*section underlying and spaced from said seat section when said seat section is in sofa position, and an intermediate section connecting the front ends of said superposed sections when they are in sofa position, said structure including a front member which, when the sections are in sofa-forming position, is located in front of the said sections, a sheet of textile fabric which in the seat position forms a cushion-supporting surface and is connected between the inner end of the seat section and the upper end of the front member, and the opposite surface of which fabric, when in said bed position, constitutes a support for the outer end portion of the mattress, and an additional mattress-supporting fabric carried by the non-reversible section and having an end connected to the cushion-supporting fabric adjacent the connection of said cushion-supporting fabric to the front member and constituting an extension of said cushion-supporting fabric, for supporting another portion of said mattress.*

*10. A sofa bed structure of the class described comprising a plurality of bed bottom sections connected together so as to be foldable from and to sofa-forming position respectively to and from bed position, said sections including an end section constituting a cushion-supporting seat section when the sections are in sofa-forming position and being reversed when unfolded so as to form the outer end section of the bed, a non-reversible section underlying and spaced from said seat section when said seat section is in sofa position, and an intermediate section connecting the front ends of said superposed sections when they are in sofa position, said structure including a front member, a sheet of textile fabric which in the seat position forms a cushion-supporting surface and is connected between the inner end of the seat section and the upper end of the front member, and the opposite surface of which fabric, when in said bed position, constitutes a support for the outer end portion of the mattress, an additional mattress-supporting fabric carried by the non-reversible section and having an end connected to the cushion-supporting fabric adjacent the connection of said cushion-supporting fabric to the front member and constituting an extension of said cushion-supporting fabric, for supporting another portion of said mattress, and connections between said intermediate section and said front member for moving said front member below the mattress-supporting fabric when the bed is unfolded.*

*11. A sofa bed structure of the class described comprising a plurality of bed bottom sections connected together so as to be foldable from and to sofa-forming position respectively to and from bed position, said sections including an end section constituting a cushion-supporting seat section when the sections are in sofa-forming position and being reversed when unfolded so as to form the outer end section of the bed, a non-reversible section underlying and spaced from said seat section when said seat section is in sofa position, an intermediate section connecting the front ends of said superposed sections when they are in sofa position, and an inner end section hinged to the inner end of said non-reversible section, said structure including a front member which is at the front of the folded sections when the latter are in sofa position, a sheet of textile fabric which in the seat position forms a cushion-supporting surface and is connected between the inner end of the seat section and the upper end of the front member and the opposite surface of which fabric, when in said bed position, constitutes a support for the outer end portion of the mattress, and an additional mattress-supporting fabric carried by the non-reversible section and having one end connected to the cushion-supporting fabric adjacent the connection of said cushion-supporting fabric to the front member and constituting an extension of said cushion-supporting fabric, for supporting another portion of said mattress, and having its other end connected to said inner end section.*

*12. A foldable bed bottom structure for sofa beds or the like comprising a plurality of hingedly connected bed bottom sections which are foldable from coplanar bed position to folded, seat-forming position, said sections in seat position including a lower, substantially horizontal section, an intermediate section extending upwardly from the front end of the lower section, and a seat section extending rearwardly from the upper end of the intermediate section above and spaced from the lower section, said seat section being overturned in its movement from bed to seat position said structure when in seat position, including a front member disposed forwardly of said intermediate section and a sheet of textile fabric connected between the upper edge of the front member and the inner end of the seat section, said textile fabric providing a cushion-supporting surface in seat position and on its opposite side a mattress-supporting surface in bed position, additional mattress-supporting fabric disposed in the other of said sections and having its outer end connected to said cushion-supporting fabric adjacent the connection of the latter to said front member, said additional fabric in bed position constituting an extension of said cushion-supporting fabric for supporting another portion of said mattress.*

No references cited.